United States Patent [19]

Oulton

[11] 4,090,043
[45] May 16, 1978

[54] ELECTRONIC HYBRID CIRCUIT

[75] Inventor: David B. Oulton, Dollard des Ormeaux, Canada

[73] Assignee: Pylon Electronic Development Company, Ltd., Canada

[21] Appl. No.: 812,362

[22] Filed: Jul. 1, 1977

[30] Foreign Application Priority Data

Jul. 9, 1976 Canada .................................. 256711

[51] Int. Cl.² ............................................. H04B 1/58
[52] U.S. Cl. ............................................. 179/170 NC
[58] Field of Search ............................... 179/170 NC Primary Examiner—George G. Stellar
Attorney, Agent, or Firm—Larson, Taylor and Hinds

[57] ABSTRACT

Disclosed is an electronic hybrid circuit which enables telephone conferences to be set up. The known systems have various limitations. For example, in one type of system, more than one person cannot be heard simultaneously. Known systems also tend to be fairly limited in the number of telephones which may be connected up in a single conference. Otherwise, signal degradation takes place due to worsening signal to noise ratio and impedance matching problems. The present invention provides an electronic hybrid circuit which enables a large number of telephones to be connected in a conference set up and which has a number of advantages, including the fact that more than one person may talk at one time. The disclosed hybrid circuit comprises a local input and output and a system input and output. The local input is connected to an analog switch and to a comparator which provides a control voltage to turn on the analog switch if a signal on the local input exceeds a predetermined minimum. The analog switch has an output connected to an amplifier which, in turn, feeds two parallel branches connected as inputs to a differential amplifier, one parallel branch including a high resistance in series with the system input and output and the other parallel branch including an adjustable voltage divider whereby the input signal levels to the differential amplifier may be made equal for signals originating from the local input and output. The differential amplifier has an output connected, via an amplitude limited amplifier, to the local input and output.

3 Claims, 4 Drawing Figures

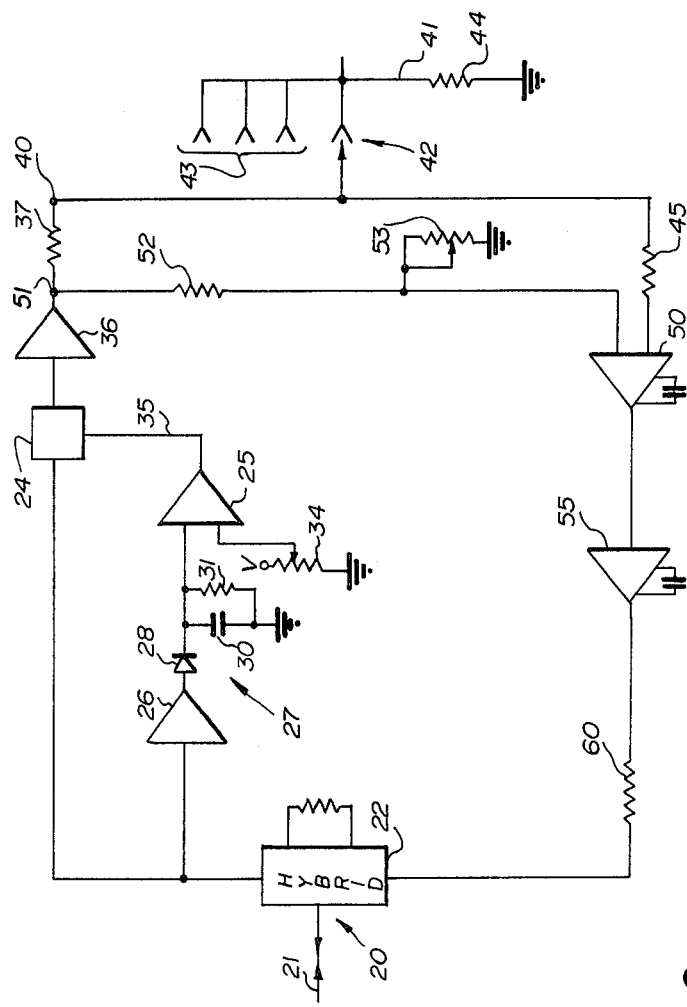
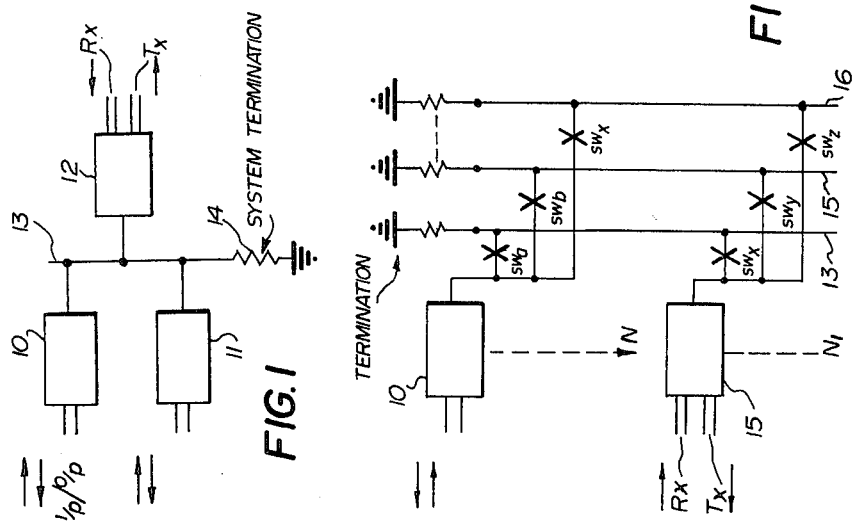

ELECTRONIC HYBRID CIRCUIT

BACKGROUND OF THE INVENTION

This invention relates to an electronic hybrid circuit.

Circuits are known which enable telephone conferences to be set up so that a number of people may converse together over telephone lines. The known systems, however, have various limitations. For example, in one type of system, more than one person cannot be heard simultaneously because, when one person talks, a signal is developed which prevents any of the other parties in the conference set up from transmitting. This detracts from the realism of the conference, because, in a face-to-face conference, of course, more than one person may talk at once.

Known systems also tend to be fairly limited in the number of telephones which may be connected up in a single conference. Otherwise, signal degradation takes place due to worsening signal to noise ratio and impedance matching problems.

SUMMARY OF THE INVENTION

The present invention provides an electronic hybrid circuit which enables a large number of telephones to be connected in a conference set up and which has a number of advantages, including the fact that more than one person may talk at one time.

Thus, in a system using an electronic hybrid circuit according to the invention, there is substantially total system access, i.e. more than one person may talk at one time. There is a high signal to noise ratio and minimal signal degradation with additions of large numbers of people or signals. The hybrid circuits may be bridged together or added with little loss in signal. The system using the electronic hybrid circuit according to the invention has a high "singing" margin, good transhybrid loss characteristics and signals to all outputs on a conference set up are equal to the signal supplied on an input channel. The hybrid circuit includes automatic compression so that signals below a certain level are unaffected whereas large signals are compressed.

Thus, in accordance with the present invention, there is provided an electronic hybrid circuit comprising a local input and output means and a system input and output means, said local input means being connected to an analog switch and to a comparator, said comparator providing a control voltage to turn on said analog switch if a signal on said local input exceeds a predetermined minimum, said analog switch having an output connected to an amplifier which, in turn, feeds two parallel branches connected as inputs to a differential amplifier, one parallel branch including a high resistance in series with the system input and output means and the other parallel branch including an adjustable voltage divider whereby the input signal levels to the differential amplifier may be made equal for signals originating from the local input and output means, said differential amplifier having an output connected, via an amplitude limited amplifier, to said local input and output means.

Detector means preferably precedes the comparator and comprises a low impedance output amplifier feeding a diode which, in turn, feeds a fast-charge slow-discharge resistor-capacitor combination.

The local input and output means may be provided with a two-wire input-output feeding a hybrid.

For four-wire operation, the hybrid is unnecessary.

BRIEF DESCRIPTION OF THE DRAWING

FIG. 1 shows a conference set up involving three electronic hybrid circuits and a single conference termination line, FIG. 2 shows two electronic hybrid circuits and a plurality of conference termination lines, FIG. 3 is a partly block, partly schematic diagram of an electronic hybrid circuit according to the invention.

DESCRIPTION OF THE PREFERRED EMBODIMENT

Figure 4:
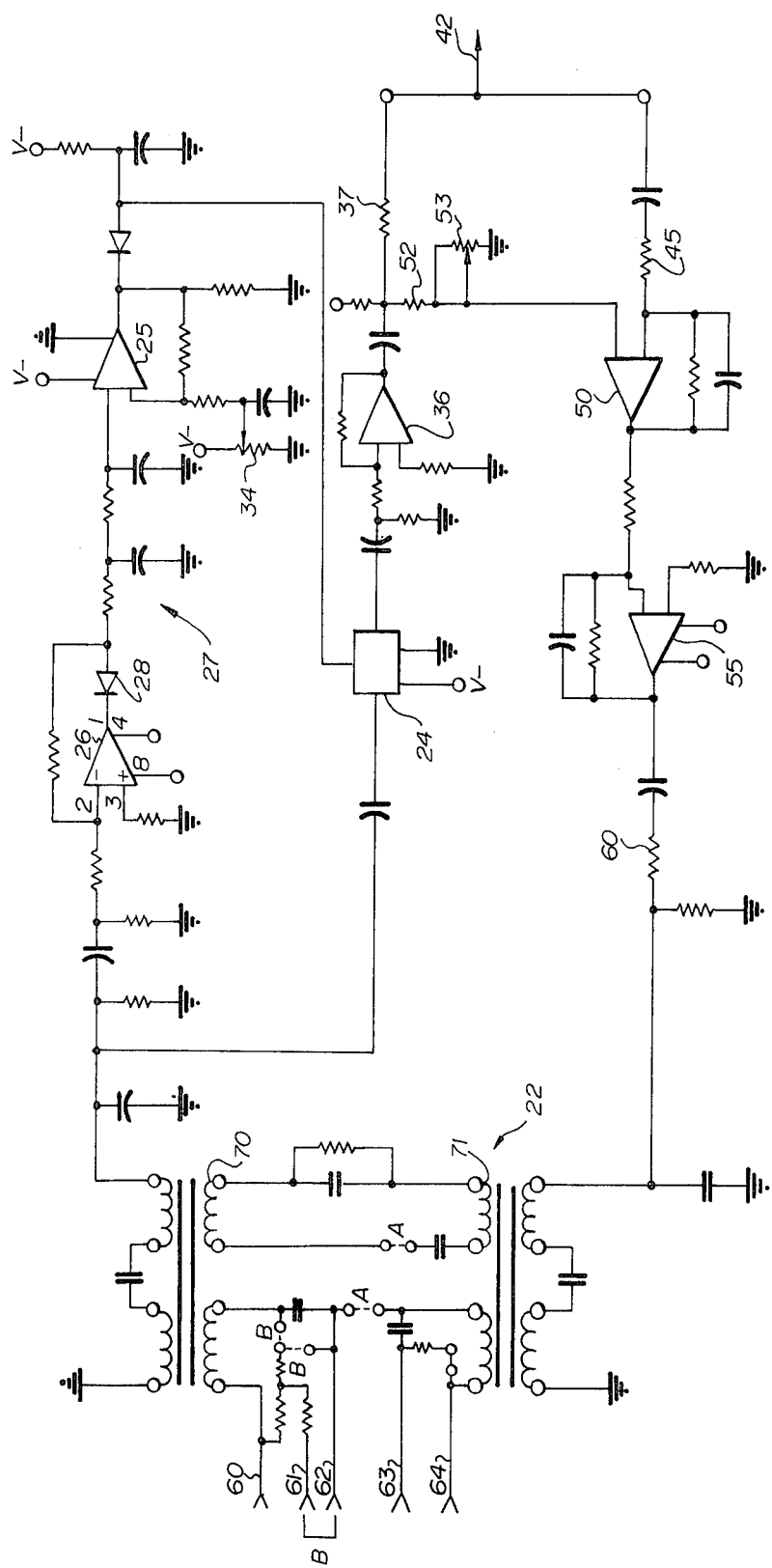
FIG. 4 is a more detailed partly block, partly schematic diagram of an electronic hybrid circuit according to the invention.

Referring to FIG. 1, three hybrid circuits 10, 11 and 12 are shown connected to a conference line 13 having a resistive system termination 14. An input on any one of the circuits 10, 11 and 12 develops a voltage across the system termination resistance 14 which results in a signal being fed to the other hybrid circuits. Circuits 10 and 11 are shown as having two-wire input/outputs whereas hybrid circuit 12 is shown as a four-wire input-/output device.

FIG. 2 shows hybrid circuits 10 and 15 although, as indicated by the dashed line, a large number of these circuits may be provided. Any one of the circuits, e.g. circuit 10, may be connectec to any one of the termination lines 13, 15 or 16 by switch means $SW_a$, $SW_b$, $SW_x$, etc. By this means, different ones of the hybrid circuits may be connected up in different conferences.

Referring to FIG. 3, an electronic hybrid circuit according to the invention is here assumed to have a two-wire local input and output means 20. The two-wire line 21 is connected via a hybrid 22 to an analog switch 24 and to a comparator 25. The connection is here made to the comparator 25 via a low impedance output amplifier 26 and detector means generally indicated at 27. The detector means 27 may comprise a diode 28 feeding a fast-charge slow-discharge resistor-capacitor combination comprising capacitor 30 and resistor 31. Because amplifier 26 is a low impedance output amplifier, it readily follows changes in signal level from the hybrid 22. However, resistor 31 provides for slow discharge of capacitor 30. Once capacitor 30 is charged sufficiently to turn on comparator 25, it will hold it on longer than the duration of the peak of the signal applied from amplifier 26 via dector diode 28. The level at which the comparator 25 switches on is set by variable resistor 34.

When comparator 25 switches on, it develops an output on line 35 which turns on analog switch 24. When analog switch 24 is turned on, signals from the hybrid 22 are passed through analog switch 24 to amplifier 36 feeding a high resistance 37. The output at 40 is a high impedance output and this is fed to a conference line 41 via switching means schematically illustrated at 42. Other hybrids may be connected to switching means diagrammatically indicated at 43. The line 41 is terminated by a resistor 44. The electronic hybrid circuits connected to the line 41 form a conference set up.

The high impedance output from 40 is fed through a resistor 45 to one input of a differential amplifier 50. The output of amplifier 36 is also fed from point 51 via fixed resistor 52 and variable resistor 53, forming a voltage divider, to the other input of the differential amplifier 50. Variable resistor 53 is adjusted so that, for signals originating from the local input 20, the two inputs to the differential amplifier are balanced and cancel out. For signals coming from the system input, i.e. from conference line 41, there is no balancing out and such signals pass through the differential amplifier 50 plus an amplitude limited amplifier 55, resistor 60 back to the hybrid 22 and hence to the local input/output 20.

The resistor-capacitor combination 31, 30 prevents the comparator 25 from being rapidly switched on and off by audio signals having various large amplitude signals followed by low amplitude signals.

For signals originating from the system input and output, i.e. from conference line 41, the gains of amplifiers 50 and 55 are such that the signal appearing at 20 is equal to that appearing at the system input/output.

FIG. 4 is similar to FIG. 3 but is somewhat more detailed. Like reference numerals are used for like parts.

In FIG. 4, the hybrid 22 is shown in some detail. The hybrid has four input leads here designated 60 to 64. For four-wire operation, the strapping B is used whereas for two-wire operation, strapping A is used. In four-wire operation, the input is across leads 60 and 62 and the output is across leads 63 and 64. For two-wire operation, the input and output wire is connected across leads 60 and 64.

In four-wire operation, the signals are simply transformer coupled by the hybrid 22 to and from the input and output. In two-wire operation, the windings 70 and 71 provide a 180° phase reversal so that a signal coming from the system input and output 42 is not fed back to the comparator 25 and analog switch 24.

Various coupling capacitors, biasing resistors, etc., are shown in FIG. 4 but no detailed explanation of them is believed necessary is their purpose will be obvious to persons skilled in the art. Sufficient items have been identified to correlate FIG. 4 with FIG. 3.

What I claim as my invention is:

1. An electronic hybrid circuit comprising a local input and output means and a system input and output means, said local input means being connected to an analog switch and to a comparator, said comparator providing a control voltage to turn on said analog switch if a signal on said local input exceeds a predetermined minimum, said analog switch having an output connected to an amplifier which, in turn, feeds two parallel branches connected as inputs to a differential amplifier, one parallel branch including a high resistance in series with the system input and output means and the other parallel branch including an adjustable voltage divider whereby the input signal levels to the differential amplifier may be made equal for signals originating from the local input and output means, said differential amplifier having an output connected, via an amplitude limited amplifier, to said local input and output means.

2. A circuit as claimed in claim 1 including detector means preceding said comparator and comprising a low impedance output amplifier feeding a diode which, in turn, feeds a fast-charge slow-discharge resistor-capacitor combination.

3. A circuit as claimed in claim 2 wherein said local input and output means has a two-wire input/output feeding a hybrid.

* * * * *